July 15, 1952 H. G. KIRKPATRICK 2,603,110
GEAR BOX
Filed Feb. 23, 1949 2 SHEETS—SHEET 1

Inventor
H. G. Kirkpatrick
By Glascock Downing Seebold
Attys.

Patented July 15, 1952

2,603,110

UNITED STATES PATENT OFFICE 2,603,110

GEAR BOX

Herwald Gordon Kirkpatrick, Mittagong, New South Wales, Australia

Application February 23, 1949, Serial No. 77,904
In Australia October 27, 1948

2 Claims. (Cl. 74—752)

This invention relates to gear boxes and more especially to gear arrangements using epicyclic gear trains.

The basic components of an epicyclic gear train are one or more sun wheels, a cluster of planetary wheels, a planetary carrier and possibly one or more annuli or ring gears and the operation of such a train as an epicyclic gear train depends on a sun wheel or an annulus being fixed so that it cannot rotate. It is further well known that when it is desired to operate in a 1:1 gear ratio through the epicyclic gear train this result may be achieved by clutching two components of the gear train together and releasing the component which had previously been fixed.

According to the invention the component to be fixed, i. e. a sun wheel or an annulus is fixed over an overrunning clutch the other side of which is fixed, the overrunning clutch being connected to the component so that it will prevent rotation of the component in the direction in which it tends to rotate during the operation of the gear, as an epicyclic train and in order to lock up the gear train for 1:1 ratio said component is clutched to another component of the gear which normally turns in the reverse direction.

The means for preventing rotation of the component to be fixed in one direction may comprise an overrunning clutch, otherwise known as a free-wheel device or a roller clutch, connected to the sun wheel at one side and to braking means at the other side.

The drive from a driving shaft to the epicyclic gear train may be effected in a variety of ways and in fact more than one driving means may be provided, selection among which may be effected by means of clutch devices and possibly additionally by overrunning clutches. Preferably the clutch device would be of the centrifugal type of clutch by which is meant a clutch which is self-operated when the speed of rotation of one of its members exceeds a certain value.

The drive then to the planetary cluster may be over one or more sun wheels engaging with pinions on the planetary cluster or may be from one or more annulus ring gears engaging with pinions on the planetary cluster, or may be a combination of these two forms of drive. With the arrangement according to the invention, if the gear is considered as operating with the planetary carrier driving the driven shaft in one direction and the sun wheel is secured against rotation in the opposite direction, then the driven shaft may be driven at various gear ratios by the epicyclic gear. If now the sun wheel which is secured against rotation in one direction is clutched to the driven shaft, i. e. to the planetary carrier, then the epicyclic gear train will lock up and there will be a drive through it at a 1:1 ratio.

Further, according to the invention in an epicyclic gear train two alternative input drives are provided one being to a sun wheel and the other to an annulus and an idler pinion is provided freely rotatable on the planetary carrier and engaging with a planetary cluster and the driving sun wheel or driving annulus, whereby the driving sun wheel and driving annulus may rotate the planetary cluster in the same direction.

It will be necessary if the driving shaft and sun wheel remain engaged and a clutch between driving shaft and annulus is engaged, to have the driving shaft connected to the sun wheel over an overrunning clutch so that when the drive is taken up by the annulus the sun wheel may be able to rotate faster than the driving shaft.

The invention further relates to a means whereby a "kick-down" can be obtained in automatic self-changing gear boxes using clutches of the centrifugal type, i. e. a quick change to a lower gear ratio.

The centrifugal type of clutch can be made to be a simple yet effective clutch means for an automatic self-changing gear box giving results which are satisfactory under all normal driving conditions. Circumstances occur, however, when it is necessary or advantageous for the driver to be able to change down rapidly to a lower gear for the purpose of getting quick acceleration, as when moving away after having been slowed up, e. g. by traffic lights. In view, however, of the torques involved, difficulty may be experienced both in disengaging a centrifugal clutch quickly when it is desired to do so and in re-engaging it again by manual means when it is desired to return to the normal self-changing facilities of the gear box.

The invention further consists of a coupling arrangement comprising a member adapted to be rotated in one direction, a second member, means for preventing the rotation of the second member in the other direction and a centrifugal clutch coupled to the first member over a manually operable clutch and adapted when operated to engage the second member whereby the second member is driven together with the first member in said one direction. Thus when the manual clutch is disengaged the second member will rapidly cease to be rotated in the direction in which the first member rotates owing to its normal tendency to be driven in the opposite direction and so the centrifugal clutch will rapidly disengage. The means for preventing the rotation of the second member in the said other direction may comprise an overrunning clutch connected at one side to the second member and at the other side to a brake.

The centrifugally operated part of the centrifugal clutch may be additionally connected to the first member over resilient means in order that the manually operable clutch may be easily re-engaged. It will be apparent that the said first and second members may form parts of an epicyclic gear train such as the one previously described or any other suitable epicyclic gear train. Thus, said first member may be the planetary carrier of the epicyclic gear train and the second member a sun wheel of the train or the first member may be a driven sun wheel of the epicyclic gear train and the second member the planetary carrier of the train, or the first member may be the driving sun wheel of the epicyclic gear train and the second member again the planetary carrier of the train.

The method of driving the epicyclic gear train and the number of pinions in the planetary cluster will, of course, depend on other conditions to be satisfied.

A unit of an automatic self-changing gear box according to the invention employs centrifugal automatic clutches operating at predetermined speeds, an epicyclic gear train consisting of four gear ratios, three forward and one reverse, a slidable dog clutch operated manually to enable a quick change from top gear to second gear, an overrunning or roller clutch to permit the driving sun wheel of the epicyclic train to rotate faster than engine speed when the train is being driven by the ring gear, and a roller clutch in combination with a self-energising shoe brake to hold the reactionary member of the epicyclic gear train stationary for first and second gear drives and automatically permit the member to rotate clockwise for top drive. The self-energising shoe brake when released gives neutral and a self-energising band brake is used to hold the ring gear stationary for reverse. The self-energising brakes are operated manually. All forward gear ratios are automatically engaged.

Referring now to the accompanying drawings which illustrate a self-changing gear unit according to the invention:

Figure 1:
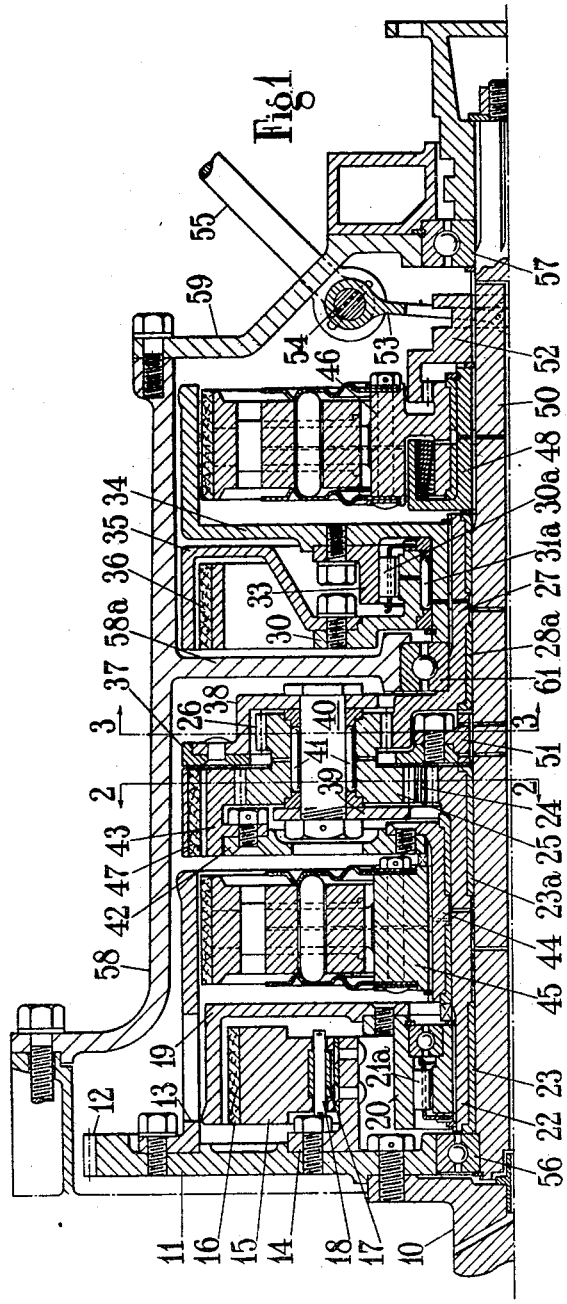
Figure 1 is a longitudinal half section.
Figure 2:
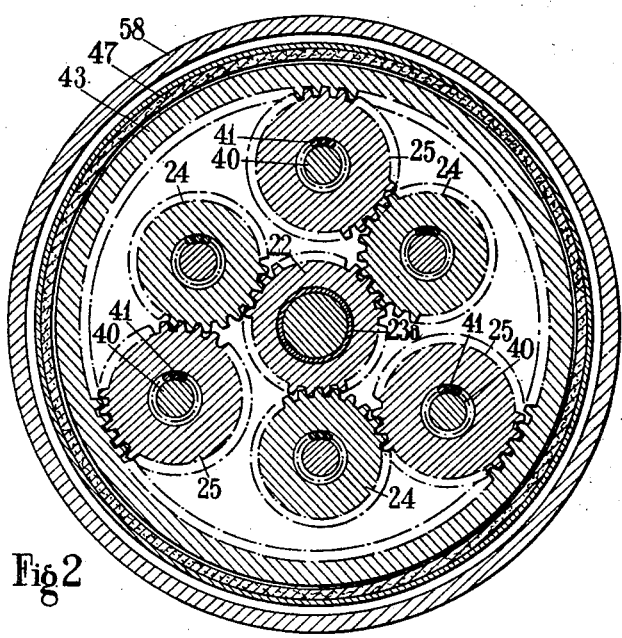
Figure 2 is a cross section elevation taken on line 2—2 of Figure 1.
Figure 3:
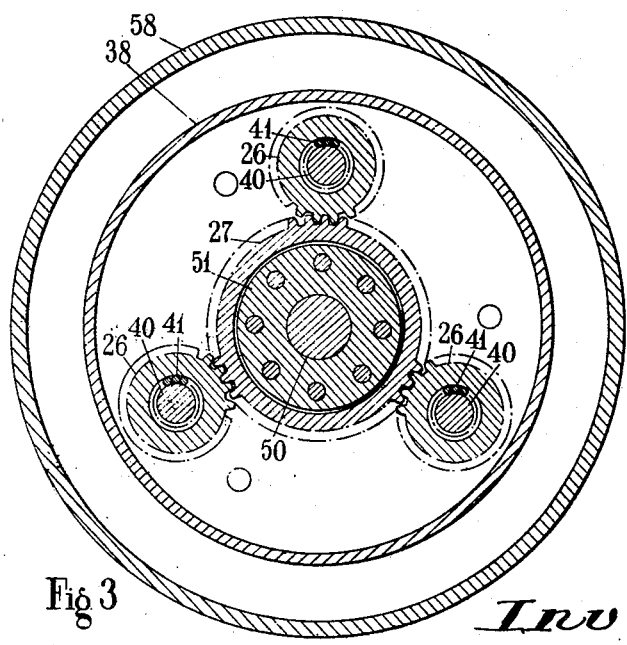
Figure 3 is a cross section elevation taken on line 3—3 of Figure 1.

The engine crankshaft 10 has secured thereto flywheel 11 having a toothed self-starter ring 12, a driving drum 13 and an inner driving drum 14, the latter supporting a plurality of segmental weights in the form of shoes 15 provided with peripheral linings 16. Each shoe is mounted on a flat spring 17 by pin 18, the springs being secured to the inner drum 14. The shoes 15 are positioned within the primary drive drum 19 which is secured to the outer member of the overrunning clutch 20 which engages with rollers 21a mounted on cam 21 secured to the hollow shaft 22 having integral therewith the driving sun wheel of the epicyclic train which sun wheel meshes with the directional planet wheel 24 which in turn meshes with cluster planet wheel 25 which is integral with cluster planet wheel 26 mounted on spindle 40 secured to fabricated carrier having central plate 37, rear plate 38 and forward plate 39, the central plate 37 being secured to flange 51 which is secured to the output or tailshaft 50. Cluster planet wheel 25 meshes with ring gear 43 secured to plate 42 which is secured to hollow shaft 44 on which is mounted an automatic centrifugal clutch 45 such as one described in my Patent Application No. 691,730, now Patent No. 2,534,133. Cluster planet wheel 26 meshes with reactionary sun wheel 27 secured to clutch drum 34 on which is mounted roller clutch 30, 30a secured to brake drum 35 mounted over brake shoes 36 attached to the housing partition 58a.

Clutch synchronising member 48 is secured to the output or tailshaft 50 and mounted on this member 48 is the automatic centrifugal clutch 46 which may be as described in my Patent Application No. 691,730. The friction spring 49 is mounted between the member 48 and the hub of the automatic clutch 46. Slidably mounted on the output or tailshaft 50 is a dog clutch 52 which is operated by yoke 53 mounted on spindle 54 having lever 55 secured to same.

The housing 58 with partition 58a and rear plate 59 supports the unit by ball races 57, 56 and 61, also bushes 23, 23a, 28 and 28a. The self-energising band brake 47 is secured to the housing 58 while a lever, not shown, operates this band brake 47, also the shoe brakes 36. Needle races 41 and 31a are used to support the cluster planet wheels 25 and 26 and the roller clutch 30 respectively.

*Operation—Forward driving*

*Neutral.*—Rotation of engine crankshaft 10 flywheel 11 at approximately 400/600 R. P. M. imparts centrifugal force to shoes 15 which is not sufficient to overcome the tension of springs 17 consequently the shoes 15 do not engage with drum 19 thus permitting the engine to rotate or idle without rotating the output or tailshaft 50.

*First gear.*—When the engine is accelerated above 400/600 R. P. M. the centrifugal force imparted to the shoes 15 overcomes the tension of the springs 17 which permits the shoes 15 to engage with the drum 19 and through the rollers 21a of the roller clutch 21 drive the hollow shaft 22 and the driving sun wheel integral therewith clockwise which rotates the directional planet wheel 24 anti-clockwise which in turn rotates the cluster planet wheels 25 and 26 clockwise and as the reactionary sun wheel 27 is prevented from rotating anti-clockwise by the roller clutch 30 and the shoe brake 36 the fabricated carrier 37, 38 and 39 mounted on the output or tailshaft 50 is rotated clockwise in first gear ratio.

*Second gear.*—The ring gear 43 is being rotated clockwise while first gear is in operation and at a predetermined speed the centrifugal clutch 45 engages with drum 13 when the cluster planet wheels 25 and 26 are rotated faster and as the reactionary sun wheel 27 is stationary the fabricated carrier 37, 38 and 39 secured to output or tailshaft 40 is rotated faster clockwise in second gear ratio, the driving sun wheel 22 being permitted to rotate faster than engine speed by the roller clutch 21.

*Top gear.*—When the output or tailshaft 50 reaches a predetermined speed the automatic centrifugal clutch 46 engages with clutch drum 34 and rotates that drum secured to reactionary sun wheel 27 clockwise which in turn rotates the whole unit in top gear or engine speed.

*Changing down.*—At a predetermined speed the automatic centrifugal clutch 46 disengages with clutch drum 34 when the tailshaft 50 is rotated in second gear and at a lower predetermined speed the automatic centrifugal clutch 45 disengages with the drive drum 13 when the tailshaft 50 is rotated in first gear and at a still slower predetermined speed the springs 17 resist the outward movement of the shoes 15 which disengage with the primary drive drum 19 when the tailshaft 50 stops rotating and the engine is permitted to run at idling speed.

*Manually changing down from top gear to second gear at any speed.*—This is done by manually operating lever 55 to withdraw dog clutch 52 disconnecting the automatic centrifugal clutch 46 from the tailshaft 50 when the reactionary sun wheel 27 stops rotating clockwise and being prevented from rotating anti-clockwise by the roller clutch 30 and the shoe brake 36 the output or tailshaft 50 is driven clockwise in second gear when the automatic centrifugal clutch 46 having lost centrifugal force disengages with the clutch drum 34 and by the action of the friction spring 49 rotates clockwise sufficiently to enable the manual engagement of the dog 52 when it is desired to again drive the tailshaft 50 in top gear.

*Neutral.*—By the disengagement of the self-energising shoe brake 36 a neutral position of the unit is obtained when the engine can be revved at any speed while the tailshaft 50 remains stationary.

*Reverse.*—Reverse is obtained by disengaging the self-energising shoe brake 36 and engaging the self-energising brake 47 with the ring gear 43 which permits the reactionary sun wheel 27 to be rotated anti-clockwise and as the ring gear 43 is stationary the fabricated carrier 37, 38 and 39 secured to tailshaft 50 is rotated anti-clockwise in reverse gear ratio.

*Engine braking in second gear when descending gradients.*—This is obtained by declutching dog 52 when the automatic centrifugal clutch 46 disengages permitting the tailshaft 50 to be driven in second gear as the automatic centrifugal clutch 45 mounted on the ring gear 43 is engaged with the engine.

Lubrication of the system is from the engine which pumps a continual flow of oil through the ducts provided in the centre of the tailshaft 50 and through further ducts to the various parts of the unit.

It will be understood that although the invention has been specifically described with respect to the use of a particular type of clutch it is not to be considered as limited in any way thereto as other forms of clutch might equally well be used.

I claim:

1. A gear box comprising an input shaft, an output shaft, a sun wheel, a centrifugally controlled automatic clutch for connecting the input shaft and the sun wheel, a planetary gear carrier secured to the output shaft, a planetary gear cluster on the planetary gear carrier, a second sun wheel engaging the planetary gear cluster, a member adapted to be fixed against rotation, an overrunning clutch connected between the fixed member and the second sun wheel, a second centrifugally controlled automatic clutch for engaging the second sun wheel and a manually operable clutch for connecting the output shaft to the second centrifugally controlled automatic clutch.

2. A gear box as claimed in claim 1 in which a friction spring is provided connecting the second centrifugally controlled automatic clutch with the output shaft.

HERWALD GORDON KIRKPATRICK.

REFERENCES CITED

The following references are of record in the file of this patent:

UNITED STATES PATENTS

| Number | Name | Date |
|---|---|---|
| Re. 22,259 | Banker | Feb. 2, 1943 |
| 1,843,193 | Banker | Feb. 2, 1932 |
| 1,843,194 | Banker | Feb. 2, 1932 |
| 1,843,195 | Banker | Feb. 2, 1932 |
| 2,371,574 | Swennes | Mar. 13, 1945 |
| 2,406,225 | Kelbel | Aug. 20, 1946 |